(12) United States Patent
Fabris et al.

(10) Patent No.: US 6,801,039 B2
(45) Date of Patent: Oct. 5, 2004

(54) APPARATUS AND METHOD FOR MEASURING MUD RESISTIVITY USING A DEFOCUSED ELECTRODE SYSTEM

(75) Inventors: Antonio Fabris, Houston, TX (US); Rashid Khokhar, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 136 days.

(21) Appl. No.: 10/142,307

(22) Filed: May 9, 2002

(65) Prior Publication Data

US 2003/0210061 A1 Nov. 13, 2003

(51) Int. Cl.⁷ .......................... G01V 3/18; G01R 27/08
(52) U.S. Cl. .................... 324/324; 324/373; 324/693
(58) Field of Search .............................. 324/693, 639, 324/715, 323, 324, 347, 354, 355, 373

(56) References Cited

U.S. PATENT DOCUMENTS

| | | | |
|---|---|---|---|
| 4,524,325 A | * | 6/1985 | Moore et al. ............... 324/375 |
| 4,658,215 A | * | 4/1987 | Vinegar et al. ............. 324/366 |
| 5,574,371 A | | 11/1996 | Tabanou et al. ............ 324/324 |
| 5,883,515 A | | 3/1999 | Strack et al. ............... 324/339 |
| 5,900,733 A | | 5/1999 | Wu et al. ................... 324/338 |
| 6,046,593 A | | 4/2000 | Eisenmann et al. ......... 324/373 |

FOREIGN PATENT DOCUMENTS

| EP | 0013224 A1 | 12/1979 | |
|---|---|---|---|
| EP | 206706 A2 * | 12/1986 | ............ G01V/3/24 |

* cited by examiner

*Primary Examiner*—N. Le
*Assistant Examiner*—Timothy J. Dole
(74) *Attorney, Agent, or Firm*—Madan, Mossman & Sriram, P.C.

(57) ABSTRACT

A mud resistivity measuring device for use in a borehole includes a pair of current electrodes disposed between a pair of guard electrodes. The measure electrodes are carried on a recessed portion of a logging tool so that the measure current flows substantially along the borehole axis and is relatively insensitive to the formation resistivity. A pair of measure electrodes on the logging tool determines a voltage difference caused by the current flow in the borehole.

16 Claims, 4 Drawing Sheets

APPARATUS AND METHOD FOR MEASURING MUD RESISTIVITY USING A DEFOCUSED ELECTRODE SYSTEM

BACKGROUND OF THE INVENTION

1. Field of the Invention

The invention is related generally to the field of interpretation of measurements made by well logging resistivity instruments for the purpose of determining the properties of earth formations. More specifically, the invention is related to an apparatus and method for determination of the electrical resistivity of borehole mud.

2. Background of the Art

Modern conventional electrical resistivity measurements are grouped into two classes, those injecting electrical currents into the formation by means of electrodes (galvanic logging devices, including lateral, spherically focused, and normal devices) and those using coils (induction logging devices) for creating eddy currents in the formation. The galvanic logging methods are really just developments of the original electrode instrument methods invented by the Schlumberger brothers in the 1920's. (L. Allaud and M. Martin, "Schlumberger, the History of a Technique," Wiley, New York, 1977). The induction logging methods and devices were created by Henri-Georges Doll in the 1940's. (H. G. Doll, Pet. Trans. AIME, 186, 148, 1947).

For the induction logging device the signal measured from a particular formation zone is inversely related to the resistivities in the formation around the borehole and to the resistivities within the borehole. For the galvanic logging devices the signal measured is non-linearly related to the resistivities and the resistivity contrasts of the borehole and the formations surrounding the borehole. At the borehole/formation/invaded zone boundaries, electrical charges arise for galvanic logging devices, while for induction logging devices, the effect is due to the induced current in the borehole/formation/invaded zone media. In the field of electromagnetic surveying, the different situations are usually described as different modes, the transverse electric (TE) mode in the case of the induction devices, and the galvanic or transverse magnetic (TM) mode for the galvanic (electrode) devices.

FIG. 1 (Prior art) is a standard diagram showing the environmental and formation conditions usually considered for determining whether to select an induction logging instrument or a lateral logging instrument when logging a specific well. For instance, the resistivity of the formation water $R_w$ is estimated using, for example, information from a nearby well. The resistivity of the mud filtrate $R_{mf}$ is then estimated, which can also be done from information from a nearby well if the mud system will be the same, or by measurement of a sample if one is available. Then the porosity of the formation is estimated, which can be based on prior known information of the porosity obtained from a nearby well or from other logs that measure porosity. Using the estimated data for $R_w$ and $R_{mf}$, a calculation of the ratio $R_{mf}/R_w$ is made. By referring to a chart or diagram similar to the one shown in FIG. 1, it is possible to determine the type of instrument most suited for the particular well.

An example model formation used in interpretation of resistivity measurements is shown in FIG. 2 (prior art). A borehole 90 of diameter $D_{bh}$ is shown penetrating a formation of interest 92. The "invaded zone" of the formation invaded by the drilling mud fluid is shown at 94, which, in this example, has a step profile of diameter $D_i$. The resistivity of the drilling mud itself in the borehole 90 is shown as $R_m$, the resistivity of the invaded zone as $R_{x0}$ and the resistivity of the formation as $R_t$. The measurements made by the logging instrument are then used to derive the formation resistivity.

The measurements have to be corrected for the effects of a mud-filled wellbore. In order to do the corrections, it is often required to know the value of a resistivity of the mud in the wellbore, and the mud resistivity value must be known with good accuracy. The wellbore penetrates a formation, and the formation has its own resistivity value. Very often, there is a large difference between the resistivity of the mud in the wellbore and the formation resistivity. As the formation to mud resistivity contrast increases for a particular depth in the wellbore, certain undesired perturbations can be seen in the output signals produced from the well logging apparatus in the wellbore. As a result, correcting these perturbations, which exist in the output signals from the induction well logging apparatus, becomes mandatory, especially when the well logging apparatus is logging large wellbores.

There are three types of devices used for determining the mud resistivity $R_m$. In the first type of system, the apparatus is specifically designed to measure the mud resistivity. U.S. Pat. No. 5,574,371 to Tabanou et al discloses a measurement probe that includes a bottom electrode disposed on a bottom of the probe when the logging apparatus is disposed in the wellbore, a second electrode, and at least one measurement electrode disposed adjacent the bottom electrode for measuring a voltage potential drop in a region of the mud which is disposed directly below the bottom electrode of the measurement probe when the probe is disposed in the wellbore. When the measurement probe is energized, a current flows in the mud between the bottom electrode and the second electrode. When the current is initially emitted into the mud from the bottom electrode, and when the current is received from the mud in the bottom electrode, the current flows in a direction which is approximately parallel to a longitudinal axis of the logging apparatus tool string. Since the measurement electrode is disposed adjacent the bottom electrode, the measurement electrode measures the voltage potential drop in a region of the mud disposed directly below the bottom electrode. In addition, the voltage potential drop in such region measured by the measurement electrode is controlled primarily by the current being emitted from or received in the bottom electrode and flowing in such region.

The second type of apparatus used for measuring mud resistivity uses a modification of prior art galvanic sondes. Such a device is disclosed by Eisenmann (U.S. Pat. No. 6,046,593). A typical configuration uses a current electrode disposed between a pair of measure electrodes. Additional guard electrodes inject current into the formation and maintain focusing of the current from the current electrode. The mud resistivity is derived by measuring the potential difference between the measure electrodes and by measuring the current in the current electrode.

The third method for determining mud resistivity is based upon inversion of data from resistivity sondes. When such methods are used, the mud resistivity becomes one more parameter in the inversion process. This increases the number of variables for the inversion and may also reduce the level of confidence in the results. This makes it desirable to have independent methods of obtaining mud resistivity.

The results obtained by Tabanou et al show an error of 7–8% in estimation of mud resistivity. Accurate measure of mud resistivity is becoming more critical to properly correct resistivity values obtained with induction and galvanic resistivity instruments. This is particularly important with transverse induction logging tools where the signal to noise ratio of the cross components may be lower than for the principal components. The present invention satisfies this need with an order of magnitude increase in accuracy of the $R_m$ measurement values.

SUMMARY OF THE INVENTION

The present invention is an apparatus conveyed in a borehole for determination of a resistivity of a borehole fluid. A pair of spaced apart current electrodes and a pair of spaced apart measure electrodes are disposed in a recessed portion of the tool between a pair of guard electrodes. Insulators are provided between the measure electrodes, between the measure electrodes and the current electrodes, and between the current electrodes and the guard electrodes. Due to the recess and due to the guard electrodes being at the same potential, the current between the current electrodes in the borehole fluid flows substantially parallel to the borehole axis and is relatively insensitive to the formation resistivity. A processor is used to determine an apparent mud resistance from the measure current and the voltage difference between the measure electrodes. The apparent mud resistance is then used to determine the mud resistivity. In an alternate embodiment of the invention, the same pair of electrodes is used as current electrodes and measure electrodes.

BRIEF DESCRIPTION OF THE FIGURES

The application is best understood with reference to the following drawings wherein like numbers in different figures refer to like components FIG. 1 (Prior art) is a diagram illustrating the typical environmental and formation conditions for currently selecting the use of a lateral or induction instrument when logging.

DETAILED DESCRIPTION OF THE INVENTION

The purpose of the invention is to increase the accuracy of the measurement of the mud resistivity $R_m$ by reducing the unwanted influence from the formation surrounding the $R_m$ sensor. The new electrode system reduces the formation effect error to less than 2%. The use of the present invention in a wireline logging environment is illustrated in FIG. 3

Figure 1:
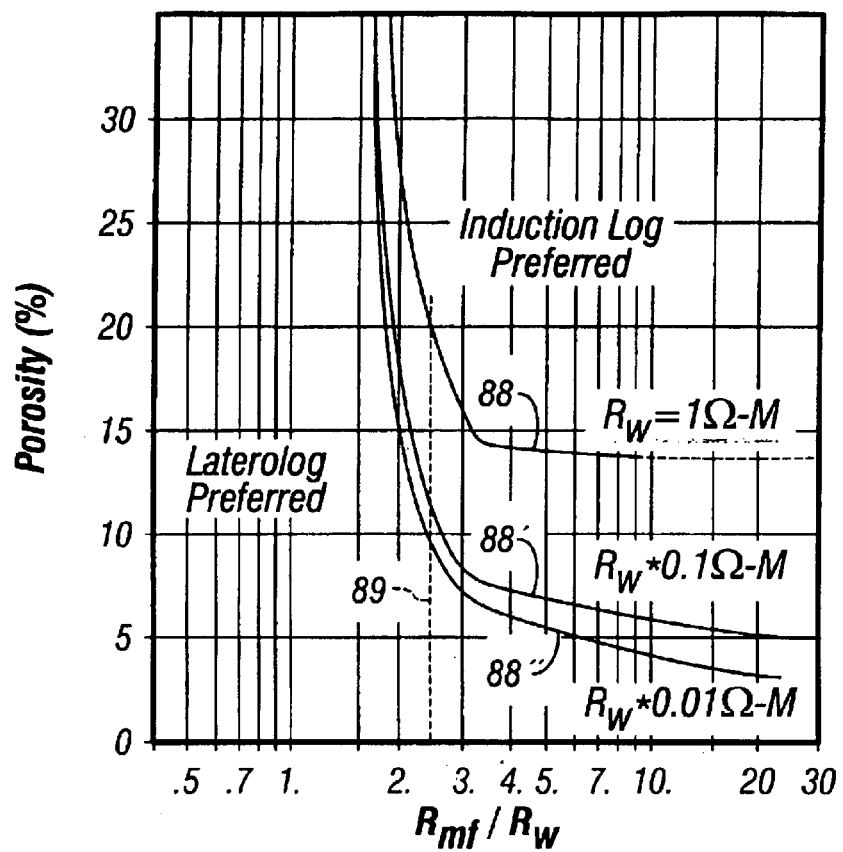
Figure 2:
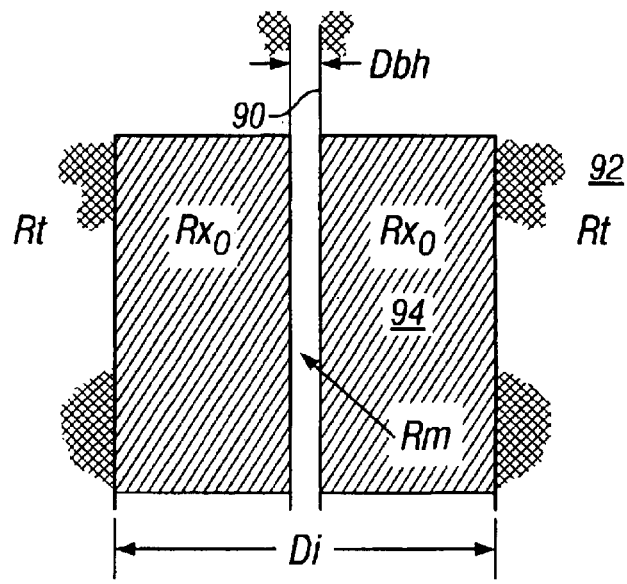
FIG. 2 (Prior Art) is a stylized schematic diagram of an assumed earth model formation penetrated by a borehole and showing various formation medium related parameters.
Figure 3:
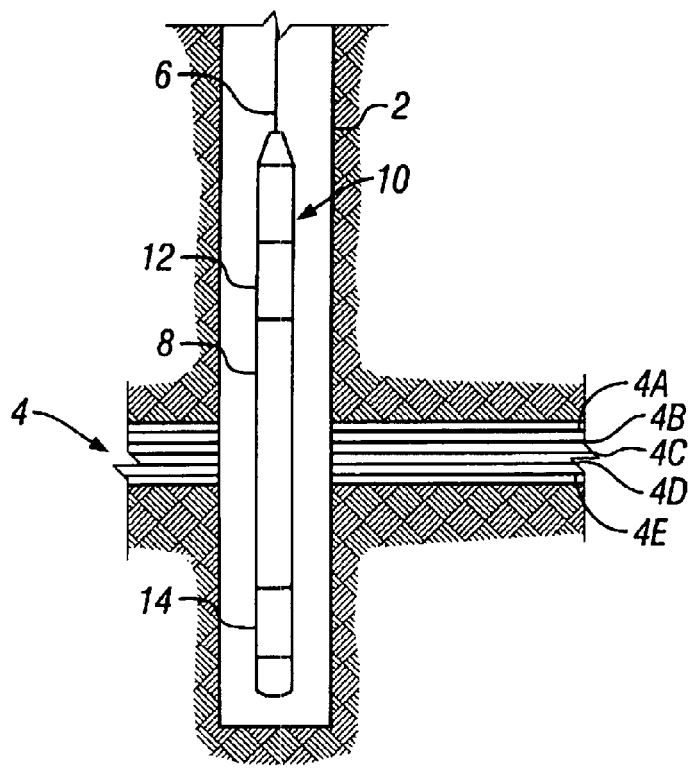
FIG. 3 shows the deployment of a sensor on a wireline.

Referring now to FIG. 3, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils for inducing electromagnetic fields in the earth formations 4 and for receiving voltage signals induced by eddy currents flowing in the earth formations 4 as a result of the electromagnetic fields induced therein. These measurements are then used to determine formation resistivities. These could be one or more of conventional multifrequency induction tools, multispacing induction tools, and multicomponent induction tools such as that used by Baker Hughes under the mark 3DEX™.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4E of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 4:
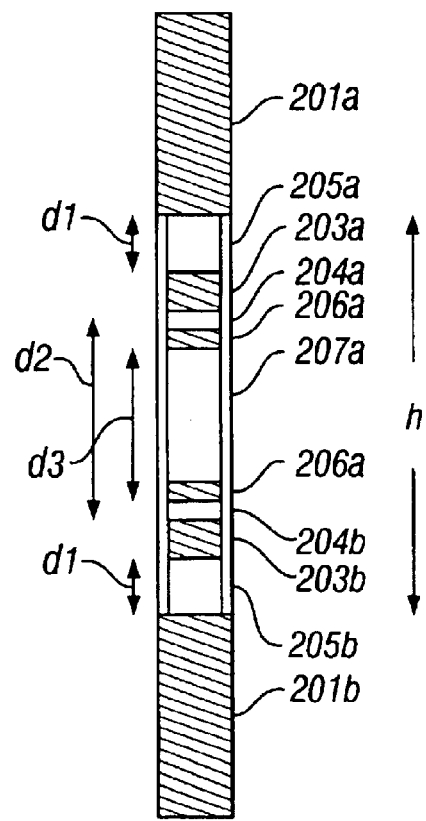
FIG. 4 illustrates the arrangement of electrodes in a preferred embodiment of the present invention.

Turning now to FIG. 4, an illustration of the mud resistivity sensor arrangement for the present invention is shown. The device illustrated may be used in any convenient location on the downhole tool string but is preferably disposed in proximity the coils of the induction logging instrument. The electrode system comprises two annular electrodes 201a, 201b (referred to as guard electrodes), two pairs of current electrodes comprising an injection electrode 203a and a return electrode 203b, and voltage measuring electrodes 206a and 206b. The spacing between the injection electrode 203a and the return electrode 203b is a distance denoted by $d_2$. The spacing between measure electrodes 206a and the 206b is a distance denoted by $d_3$. In a preferred embodiment of the invention, current electrodes 203a, 203b are both 0.250" (6.35 mm) long, and measure electrodes 206a, 206b are both 0.05" (1.27 mm) long though the size is not to be construed as a limitation. It is also to be noted that the relative positions of the current electrodes 203a, 203b is for illustrative purposes only and they could be interchanged without detracting from the invention.

The current electrodes 203a, 203b are separated from the measure electrodes 206a, 206b by insulating material 204a and 204b and from each other by an insulating material 207a and from the electrodes 201a, 201b by insulating material 205a, 205b. As can be seen in FIG. 4, the combination of 205a, 203a, 204a, 206a, 207a, 206b, 204b, 203b, 205b is recessed and has a smaller diameter than the electrodes 201a, 201b. The electrodes 201a, 201b define the diameter of the main instrument body (not shown in FIG. 4). In an alternate embodiment of the invention (not shown), the same electrodes can be used as current electrodes and measure electrodes.

The electrodes 201a, 201b in a preferred embodiment of the invention are 72" (~28.3 cm) in length and serve the function of defocusing the entire system. This makes it possible to obtain more accurate measurements of mud resistivity that are relatively insensitive to the influence of the surrounding formation. The length of the electrodes in the preferred embodiment is not intended to be a limitation: the only requirement is that the length be sufficient to defocus the $R_m$ sensor current flow.

With the arrangement of electrodes shown in FIG. 4, the currents in the mud produced by the current electrodes flow substantially parallel to the longitudinal axis of the tool and are relatively insensitive to the formation resistivity $R_t$.

Denoting by V the voltage difference between the measure electrodes and by I the current in the measure electrodes, an apparent mud resistance $R_{maz}$ is given by $$R_{ma} = V/I$$

From a knowledge of the geometry of the tool (specifically, the diameter of the recessed portion of the tool and the lengths $d_1$, $d_2$, $d_3$, and h) the k factor can be calculated, and the actual resistivity $R_m$ may be obtained.

$$R_m = k \cdot V/I \quad (1).$$

The recess is provided to avoid the possibility of the measure electrodes coming in direct contact with the borehole wall even when the tool is fully decentralized. Such contact is known to cause errors in the $R_m$ measurement with prior art tools.

Figure 5:
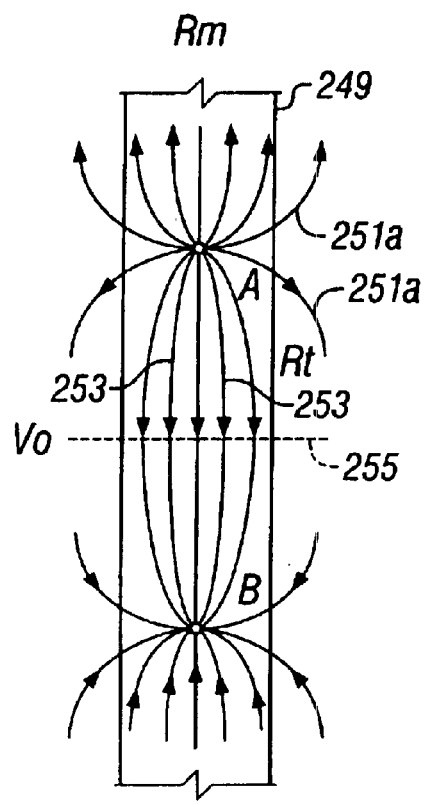
FIG. 5 illustrates current paths for two measure electrodes in a borehole wherein there are no guard electrodes on the tool
Figure 6:
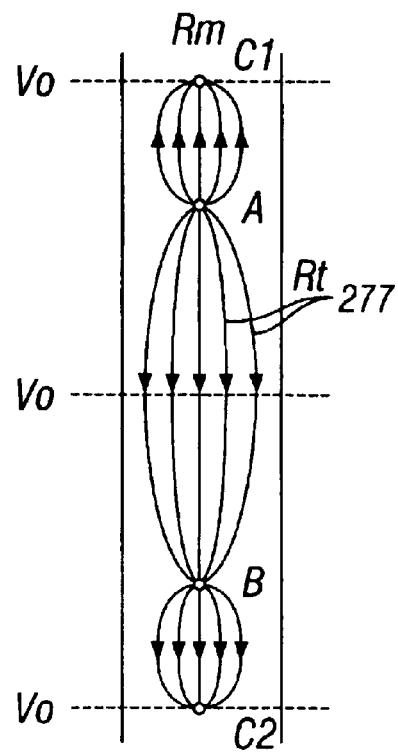
FIG. 6 illustrates current paths for two measure electrodes in a borehole wherein there are guard electrodes provided on the tool

The importance of the guard electrodes is seen in reference to FIGS. 5 and 6. FIG. 5 shows an injection electrode "A" and a return electrode "B"; these correspond to current electrodes 203a and 203b in the mud resistivity sensor of FIG. 4. In FIG. 5 the current lines from the injection electrode "A" flow towards the return electrode "B" and are free to depart from the axis of the sensor. Most of the current flow close to the axis of the sensor 253, but the geometry, distance between the electrodes A and B, borehole size 249, mud resistivity $R_m$ and formation resistivity $R_t$ determine how much current will flow beyond the borehole wall 251a into the formation and be influenced by $R_t$. When $R_t$ is different from $R_m$ this flow produces an error.

Electrode "A" is at a higher potential and electrode "B" is at a lower potential with respect to the background. A line $V_0$ denoted by 255 of zero potential relative to a background exists at a distance half way from A to B. The potential decreases gradually towards zero away from electrode "A" and increases gradually towards zero away from electrode "B". This potential profile is important and will be contrasted with the case when the guard electrodes are present.

Referring now to FIG. 6 where the potential equalization guards are present, electrodes "C1" and "C2" simulate the guard electrodes 201a and 201b of FIG. 4. If the electrodes "C1" and "C2" where not connected together, C1 would assume a positive potential and "C2" a negative potential and the general behavior of the sensor would not change significantly relative to the configuration of FIG. 5. If, however, "C1" and "C2" are connected together (at the same potential) due to symmetry they will assume a potential very close to zero (background potential). This drastically changes the current line configuration as can be seen schematically in FIG. 6. In this case there are three lines of zero potential indicated in the figure with Vo. The current lines 277 are mainly confined in this case to the borehole and the undesirable influence of $R_t$ on the $R_m$ measurement is drastically reduced.

Figure 7:
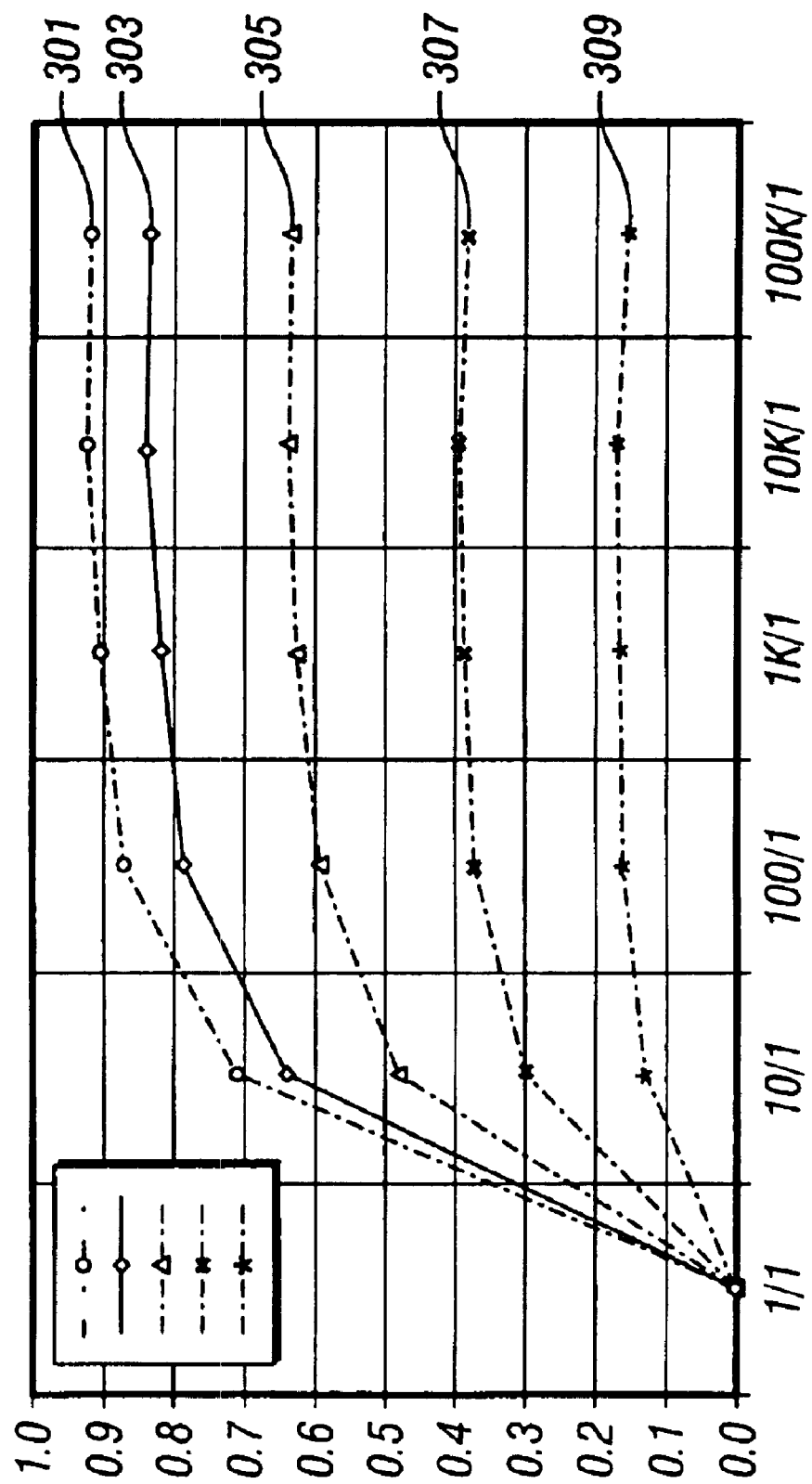
FIG. 7 illustrates the error in determination of mud resistivity for a range of contrasts of formation and mud resistivity for different selections of the spacings in the electrode arrangement of FIG. 4

Turning now to FIG. 7, results of modeling simulations with the configuration shown in FIG. 4 are illustrated. The abscissa is the ratio of the formation resistivity to the mud resistivity while the ordinate is the percentage error resulting from use of eq. (1) for obtaining the mud resistance.

The curve 301 corresponds to values for $d_1$ and $d_2$ of 0.125" and 1.125" respectively. The curve 303 is for values of 0.25" and 0.875", the curve 305 for 0.375" and 0.625", the curve 307 for 0.5" and 0.375" while the curve 309 is for values for $d_1$ and $d_2$ of 0.625" and 0.125" respectively. In all cases, the total length of the recessed interval was kept at 1.875" and the diameter of the measuring electrodes to 2".

Examination of FIG. 7 shows that for all the cases, the sensor error for each of the cases is less than 1%. This is a vast improvement over the errors in prior art mud resistivity measuring devices—typically around 7%.

The present invention has been described with reference to a wireline implementation. It may also be used with little or no modification on measurement while drilling (MWD) implementations wherein the apparatus described is conveyed downhole on a drilling tubular.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus conveyed in a borehole for determination of a resistivity of a fluid within the borehole, the apparatus comprising:
   (a) a housing having a pair of space apart guard (defocusing) electrodes; and
   (b) a pair of recessed spaced apart current electrodes, disposed between the guard electrodes flowing current therebetween through said fluid, said current electrodes separated from each other and from the guard electrodes by a plurality of insulating members
   wherein an outer diameter of the guard electrodes is greater than an outer diameter of the current electrodes.

2. The apparatus of claim 1 further comprising a pair of measure electrodes disposed between the pair of current electrodes for measuring a potential drop due to said current in the fluid.

3. The apparatus of claim 1 wherein the pair of current electrodes further measures a potential drop between the current electrodes.

4. The apparatus of claim 2 further comprising a processor for determining from said electrical current between said current electrodes, and a potential difference between said pair of measure electrodes said resistivity of the borehole fluid.

5. The apparatus of claim 2 wherein said measure electrodes and said plurality of insulating members have an outer diameter less than an outer diameter of said housing.

6. The apparatus of claim 1 wherein a distance between the pair of current electrodes is between about 0.125" and about 1.125".

7. The apparatus of claim 1 wherein a distance between each of the pair of current electrodes and a corresponding proximate one of said guard electrodes is between about 0.125" and about 0.625".

8. The apparatus of claim 1 wherein said apparatus is adapted to be conveyed into the borehole on one of (i) a wireline, and, (ii) a drilling tubular.

9. The apparatus of claim 1 wherein the pair of guard electrodes are at substantially the same electrical potential.

10. The apparatus of claim 1 wherein the pair of guard electrodes confine an electrical current between said current electrodes to flow substantially parallel to an axis of the borehole.

11. A method of determining a resistivity of a fluid within a borehole, the method comprising:
 (a) using a first current electrode disposed on a logging tool within the borehole for conveying a measure current into fluid and receiving said current at a second current electrode on the logging tool;
 (b) using a pair of measure electrodes disposed on the logging tool for measuring a voltage difference in the fluid;
 (c) using a first guard (defocusing) electrode on the logging tool proximate to and spaced apart from the first current electrode and a second guard (defocusing) electrode on the logging tool proximate to and spaced apart from the second current electrode for confining said measure current to flow substantially parallel to an axis of the borehole wherein an outer diameter of the guard electrodes is greater than an outer diameter of the measure electrodes; and
 (d) determining from the measure current and a voltage difference between the measure electrodes said resistivity of the fluid.

12. The method of claim 11 further comprising conveying said logging tool into the borehole on one of (i) a wireline, and, (ii) a drilling tubular.

13. The method of claim 11 wherein confining said electrical current further comprises maintaining the first and second guard electrodes at substantially the same potential.

14. The method of claim 13 wherein maintaining the first and second guard electrodes further comprises providing an electrical connection there between.

15. An apparatus conveyed in a borehole for determination of a resistivity of a fluid within the borehole, the apparatus comprising:
 (a) a pair of recesses spaced apart current electrodes separated from each other by an insulating member for conveying a measure current into said fluid;
 (b) a pair of spaced apart measure electrodes for measuring a voltage difference in said fluid;
 (c) a pair of guard electrodes disposed on either side of said current electrodes for limiting a flow of the measure current substantially parallel to an axis of the borehole wherein an outer diameter of the guard electrodes is greater than an outer diameter of the measure electrodes.

16. The apparatus of claim 15 wherein said guard electrodes are maintained at substantially the same electrical potential.

\* \* \* \* \*